US008115713B2

(12) United States Patent

Tagami

(10) Patent No.: US 8,115,713 B2

(45) Date of Patent: Feb. 14, 2012

(54) IMAGE PROCESSING APPARATUS, IMAGE PROCESSING METHOD, AND COMPUTER PROGRAM

(75) Inventor: Shigekatsu Tagami, Kanagawa (JP)

(73) Assignee: Sony Corporation (JP)

( * ) Notice: Subject to any disclaimer, the term of this patent is extended or adjusted under 35 U.S.C. 154(b) by 856 days.

(21) Appl. No.: 12/215,095

(22) Filed: Jun. 25, 2008

(65) Prior Publication Data

US 2009/0009509 A1 Jan. 8, 2009

(30) Foreign Application Priority Data

Jul. 5, 2007 (JP) ................................ P2007-177362

(51) Int. Cl.

*G06F 3/038* (2006.01)

*G09G 5/00* (2006.01)

(52) U.S. Cl. .............. 345/87; 345/214; 345/89; 345/99; 345/100; 345/208; 345/204; 345/532; 345/537; 345/539; 345/545

(58) Field of Classification Search .............. 345/88–89, 345/94–95, 204, 208–209, 99–101, 214, 345/530, 532, 537, 539, 545, 690; 348/791–793, 348/448, 451–452

See application file for complete search history.

(56) References Cited

U.S. PATENT DOCUMENTS

| | | | | |
|---|---|---|---|---|
| 6,556,180 | B1 * | 4/2003 | Furuhashi et al. | 345/87 |
| 6,853,384 | B2 * | 2/2005 | Miyata et al. | 345/601 |
| 7,057,597 | B2 * | 6/2006 | Ikeda | 345/95 |
| 2004/0196254 | A1 * | 10/2004 | Mizumaki | 345/103 |

* cited by examiner

*Primary Examiner* — Lun-Yi Lao

*Assistant Examiner* — Saiful A Siddiqui

(74) *Attorney, Agent, or Firm* — Lerner, David, Littenberg, Krumholz & Mentlik, LLP

(57) ABSTRACT

An image processing apparatus including a frame doubling processing part for generating a doubled image signal, a false impulse drive processing part for outputting a current image signal after dividing the doubled image signal, a first frame memory for outputting the current image signal as a previous image signal delayed by one sub-frame, a correction processing part for correcting a gradation level of the current image signal after the previous image signal and the current image signal being input thereto, a second frame memory for outputting a delayed doubled image signal from the doubled image signal, and a movement detector for outputting a movement detection signal after the delayed doubled image signal and the doubled image signal being input thereto is provided, wherein the correction processing part corrects the gradation level of the current image signal when the movement detection signal is a signal indicating a dynamic image.

6 Claims, 9 Drawing Sheets

FIG.8

| GRADATION LEVEL OF PREVIOUS IMAGE SIGNAL (CORRECTION TABLE UPPER ADDRESS) \ GRADATION LEVEL OF CURRENT IMAGE SIGNAL (CORRECTION TABLE LOWER ADDRESS) | 0 (0) | 32 (1) | 64 (2) | 96 (3) | 128 (4) | 160 (5) | 192 (6) | 224 (7) | 255 (8) |
|---|---|---|---|---|---|---|---|---|---|
| 0(0) | 0 | 37 | 75 | 112 | 151 | 183 | 213 | 237 | 255 |
| 32(1) | 0 | 32 | 70 | 108 | 147 | 180 | 211 | 236 | 255 |
| 64(2) | 0 | 25 | 64 | 103 | 142 | 176 | 208 | 235 | 255 |
| 96(3) | 0 | 18 | 58 | 98 | 135 | 171 | 205 | 233 | 255 |
| 128(4) | 0 | 9 | 51 | 90 | 128 | 166 | 200 | 231 | 255 |
| 160(5) | 0 | 4 | 44 | 83 | 123 | 160 | 196 | 229 | 255 |
| 192(6) | 0 | 0 | 37 | 77 | 119 | 156 | 192 | 227 | 255 |
| 224(7) | 0 | 0 | 31 | 72 | 114 | 151 | 188 | 224 | 255 |
| 255(8) | 0 | 0 | 23 | 64 | 107 | 145 | 184 | 220 | 255 |

IMAGE PROCESSING APPARATUS, IMAGE PROCESSING METHOD, AND COMPUTER PROGRAM

CROSS-REFERENCE TO RELATED APPLICATIONS

The present application claims priority from Japanese Patent Application No. JP 2007-177362, filed in the Japanese Patent Office on Jul. 5, 2007, the entire content of which is incorporated herein by reference.

BACKGROUND OF THE INVENTION

1. Field of the Invention

The present invention relates to an image processing apparatus, an image processing method, and a computer program, and in particular, relates to an image processing apparatus, an image processing method, and a computer program for improving image blurring generated when dynamic images are displayed in a hold-type display device such as a liquid crystal display device.

2. Description of the Related Art

An issue of dynamic images being blurred arises when they are displayed in a hold-type display device such as a liquid crystal display device. Dynamic image blurring in a hold-type display device such as a liquid crystal display device is caused by a hold effect in which pixels displaying an image hold display content also in a non-selection period. In a liquid crystal display device, dynamic image blurring is also caused by the fact that a liquid crystal response is incapable of sufficiently following a driving voltage depending on a level change pattern of the voltage (driving voltage) input to pixels due to slowness of the response speed of liquid crystal.

As a method of preventing dynamic image blurring by the hold effect, a method of performing time division driving as false impulse driving as if to artificially provide an impulse display is known. Time division driving as false impulse driving is a driving method for providing a display in such a way that brightness in accordance with an input image is perceived by dividing one frame period for displaying into a plurality of sub-frames, displaying each sub-frame with different display luminance, and integrating the display luminance thereof with time.

That is, a display near an impulse-type display can artificially be provided also in a hold-type display device by performing time division driving and providing a low-luminance display (a display near a black display) to at least one sub-frame among the plurality of divided sub-frames, producing an effect of preventing dynamic image blurring.

Also as a method of preventing dynamic image blurring caused by slowness of the response speed of liquid crystal, a method of correcting a liquid crystal response called an overdrive is known. The overdrive is a method by which when the signal level of pixels driving a liquid crystal changes between frames, a high signal level or low signal level is temporarily applied in accordance with change in level to accelerate movement of the liquid crystal so that a display in accordance with an input image can be provided. By applying the signal in this manner, an effect of preventing dynamic image blurring is produced.

Since time division driving as false impulse driving and the overdrive are different in their intended factors to solve, they can be used in combination to improve dynamic image blurring of a liquid crystal display device and the like. And a method is known by which, when they are combined, the overdrive is performed after time division driving as false impulse driving.

SUMMARY OF THE INVENTION

To prevent dynamic image blurring by performing the overdrive, an image signal at present (also called a current image signal) and an image signal one sub-frame delayed (a previous image signal) are used. An image signal is corrected in accordance with gradation levels of a current image signal and a previous image signal.

However, there is an issue in the past that, when not only dynamic images, but also still images are displayed, that is, there is no change in gradation level, image signals are also corrected and therefore, linearity of gradations of a still image deteriorates.

The present invention has been made in view of the above issue and there is a need for a new and improved image processing apparatus, image processing method, and computer program capable of improving both dynamic image blurring caused by the hold effect and that caused by slowness of the response speed of liquid crystal without causing deterioration of linearity of the gradation.

According to an embodiment of the present invention, there is provided an image processing apparatus for performing processing of an image being input to a display device including a frame doubling processing part for generating a doubled image signal by dividing one frame period of an input image signal that has been input into two sub-frames and repeating the input image signal twice; a false impulse drive processing part for outputting a signal obtained by dividing the doubled image signal into two sub-frames of different gradation levels whose time integral of luminance realizes luminance in one frame period of the input image signal as a current image signal; a first frame memory for outputting a previous image signal delayed by one sub-frame after storing the current image signal output by the false impulse drive processing part; a correction processing part for correcting the gradation level of the current image signal in accordance with a difference of the gradation level of the previous image signal and that of the current image signal after the previous image signal and the current image signal being input thereto; a second frame memory for outputting a delayed doubled image signal delayed by one sub-frame after storing the doubled image signal; and a movement detector for outputting a movement detection signal by determining whether a still image or a dynamic image is concerned in accordance with a difference of the gradation level of the delayed doubled image signal and that of the doubled image signal after the delayed doubled image signal and the doubled image signal being input thereto, wherein the correction processing part corrects the gradation level of the current image signal when the movement detection signal is a signal indicating a dynamic image, and does not correct the gradation level of the current image signal when the movement detection signal is a signal indicating a still image.

According to such a configuration, the frame doubling processing part generates a doubled image signal by dividing one frame period of an input image signal that has been input into two sub-frames and repeating the input image signal twice, the false impulse drive processing part divides the doubled image signal generated by the frame doubling processing part into two sub-frames of different gradation levels whose time integral of luminance realizes luminance in one frame period of the input image signal to output as a current image signal, and the first frame memory outputs a previous image signal delayed by one sub-frame after storing the current image signal output by the false impulse drive processing part. The correction processing part corrects the gradation level of the current image signal in accordance with a difference of the gradation level of the previous image signal and that of the current image signal after the previous image signal output by the first frame memory and the current image signal output by the false impulse drive processing part being input thereto. The second frame memory outputs a delayed doubled image signal delayed by one sub-frame after storing the doubled image signal output by the frame doubling processing part and the movement detector outputs a movement detection signal by determining whether a still image or a dynamic image is concerned in accordance with a difference of the gradation level of the delayed doubled image signal and that of the doubled image signal after the delayed doubled image signal output by the second frame memory and the doubled image signal output by the frame doubling processing part being input thereto. Then, the correction processing part corrects the gradation level of the current image signal when the movement detection signal is a signal indicating a dynamic image, and does not correct the gradation level of the current image signal when the movement detection signal is a signal indicating a still image. As a result, when a still image is displayed, both dynamic image blurring caused by the hold effect and that caused by slowness of the response speed of liquid crystal can be improved without causing deterioration of linearity of the gradation.

According to another embodiment of the present invention, there is provided an image processing apparatus for performing processing of an image being input to a display device including a frame doubling processing part for generating a doubled image signal by dividing one frame period of an input image signal that has been input into two sub-frames and repeating the input image signal twice; a false impulse drive processing part for outputting a signal obtained after dividing the doubled image signal into two sub-frames of different gradation levels whose time integral of luminance realizes luminance in one frame period of the input image signal as a current image signal; a frame memory for outputting a delayed doubled image signal delayed by one sub-frame after storing the doubled image signal; a reversed false impulse drive processing part for outputting a signal obtained by dividing the delayed doubled image signal into two sub-frames of different gradation levels whose time integral of luminance realizes luminance in one frame period of the input image signal and interchanging a first half sub-frame and a second half sub-frame as a previous image signal; a movement detector for outputting a movement detection signal by determining whether a still image or a dynamic image is concerned in accordance with a difference of the gradation level of the delayed doubled image signal and that of the doubled image signal after the delayed doubled image signal and the doubled image signal being input thereto; and a correction processing part for correcting the gradation level of the current image signal in accordance with a difference of the gradation level of the previous image signal and that of the current image signal after the previous image signal and the current image signal being input thereto, wherein the correction processing part corrects the gradation level of the current image signal when the movement detection signal is a signal indicating a dynamic image, and does not correct the gradation level of the current image signal when the movement detection signal is a signal indicating a still image.

According to such a configuration, the frame doubling processing part generates a doubled image signal by dividing one frame period of an input image signal that has been input into two sub-frames and repeating the input image signal twice and the false impulse drive processing part divides the doubled image signal from the frame doubling processing part into two sub-frames of different gradation levels whose time integral of luminance realizes luminance in one frame period of the input image signal to output as a current image signal. The frame memory outputs a delayed doubled image signal delayed by one sub-frame after storing the doubled image signal from the frame doubling processing part and the reversed false impulse drive processing part outputs a signal obtained by dividing the delayed doubled image signal from the frame memory into two sub-frames of different gradation levels whose time integral of luminance realizes luminance in one frame period of the input image signal and interchanging a first half sub-frame and a second half sub-frame as a previous image signal. The movement detector outputs a movement detection signal by determining whether a still image or a dynamic image is concerned in accordance with a difference of the gradation level of the delayed doubled image signal and that of the doubled image signal after the delayed doubled image signal from the frame memory and the doubled image signal from the frame doubling processing part being input thereto. Then, the correction processing part corrects the gradation level of the current image signal in accordance with a difference of the gradation level of the previous image signal and that of the current image signal after the previous image signal from the reversed false impulse drive processing part and the current image signal from the false impulse drive processing part being input thereto, and corrects the gradation level of the current image signal when the movement detection signal is a signal indicating a dynamic image and does not correct the gradation level of the current image signal when the movement detection signal is a signal indicating a still image. As a result, when a still image is displayed, both dynamic image blurring caused by the hold effect and that caused by slowness of the response speed of liquid crystal can be improved without causing deterioration of linearity of the gradation.

According to another embodiment of the present invention, there is provided an image processing apparatus for performing processing of an image being input to a display device including a frame doubling processing part for generating a doubled image signal by dividing one frame period of an input image signal that has been input into two sub-frames and repeating the input image signal twice; a false impulse drive processing part for outputting a signal obtained by dividing the doubled image signal into two sub-frames of different gradation levels whose time integral of luminance realizes luminance in one frame period of the input image signal as a current image signal; a frame memory for outputting a previous image signal delayed by two sub-frames after storing a current image signal output by the false impulse drive processing part; and a correction processing part for correcting the gradation level of the current image signal in accordance with a difference of the gradation level of the previous image signal and that of the current image signal after the previous image signal and the current image signal being input thereto, wherein the correction processing part has a correction data table having two different pieces of correction data stored therein and switches the correction data table for a first half sub-frame and a second half sub-frame.

According to such a configuration, the frame doubling processing part generates a doubled image signal by dividing one frame period of an input image signal that has been input into two sub-frames and repeating the input image signal twice and the false impulse drive processing part divides the doubled image signal generated by the frame doubling processing part into two sub-frames of different gradation levels whose time integral of luminance realizes luminance in one frame period of the input image signal to output as a current image signal. The frame memory outputs a previous image signal delayed by two sub-frames after storing a current image signal output by the false impulse drive processing part, and the correction processing part corrects the gradation level of the current image signal in accordance with a difference of the gradation level of the previous image signal and that of the current image signal after the previous image signal from the frame memory and the current image signal from the false impulse drive processing part being input thereto, and has a correction data table having two different pieces of correction data stored therein and switches the correction data table for a first half sub-frame and a second half sub-frame. As a result, when a still image is displayed, both dynamic image blurring caused by the hold effect and that caused by slowness of the response speed of liquid crystal can be improved without causing deterioration of linearity of the gradation.

According to another embodiment of the present invention, there is provided an image processing method for performing processing of an image being input to a display device including a frame doubling processing step of generating a doubled image signal by dividing one frame period of an input image signal that has been input into two sub-frames and repeating the input image signal twice; a false impulse drive processing step of dividing the doubled image signal into two sub-frames of different gradation levels whose time integral of luminance realizes luminance in one frame period of the input image signal; a current image signal storage step of outputting a previous image signal delayed by one sub-frame after storing a current image signal output by the false impulse drive processing step; a correction processing step of correcting the gradation level of the current image signal in accordance with a difference of the gradation level of the previous image signal and that of the current image signal after the previous image signal and the current image signal being input thereto; a delayed doubled image signal output step of outputting a delayed doubled image signal delayed by one sub-frame after storing the doubled image signal; and a movement detection step of outputting a movement detection signal by determining whether a still image or a dynamic image is concerned in accordance with a difference of the gradation level of the delayed doubled image signal and that of the doubled image signal after the delayed doubled image signal and the doubled image signal being input thereto, wherein the correction processing step corrects the gradation level of the current image signal when the movement detection signal is a signal indicating a dynamic image, and does not correct the gradation level of the current image signal when the movement detection signal is a signal indicating a still image.

According to another embodiment of the present invention, there is provided an image processing method for performing processing of an image being input to a display device including a frame doubling processing step of generating a doubled image signal by dividing one frame period of an input image signal that has been input into two sub-frames and repeating the input image signal twice; a false impulse drive processing step of dividing the doubled image signal into two sub-frames of different gradation levels whose time integral of luminance realizes luminance in one frame period of the input image signal; a delayed doubled image signal of outputting a delayed doubled image signal delayed by one sub-frame after storing the doubled image signal; a reversed false impulse drive processing step of outputting the delayed doubled image signal as a previous image signal after dividing the delayed doubled image signal into two sub-frames of different gradation levels whose time integral of luminance realizes luminance in one frame period of the input image signal and interchanging a first half sub-frame and a second half sub-frame; a movement detection step of outputting a movement detection signal by determining whether a still image or a dynamic image is concerned in accordance with a difference of the gradation level of the delayed doubled image signal and that of the doubled image signal after the delayed doubled image signal and the doubled image signal being input thereto; and a correction processing step of correcting the gradation level of the current image signal in accordance with a difference of the gradation level of the previous image signal and that of the current image signal after the previous image signal and the current image signal being input thereto, wherein the correction processing step corrects the gradation level of the current image signal when the movement detection signal is a signal indicating a dynamic image, and does not correct the gradation level of the current image signal when the movement detection signal is a signal indicating a still image.

According to another embodiment of the present invention, there is provided an image processing method for performing processing of images recorded together when dynamic images and voice are recorded and input to a redisplay device when dynamic images and voice are played back, including a frame doubling processing step of generating a doubled image signal by dividing one frame period of an input image signal that has been input into two sub-frames and repeating the input image signal twice; a false impulse drive processing step of outputting a signal obtained by dividing the doubled image signal into two sub-frames of different gradation levels whose time integral of luminance realizes luminance in one frame period of the input image signal as a current image signal; a previous image signal output step of outputting a previous image signal delayed by two sub-frames after storing a current image signal output by the false impulse drive processing part; and a correction processing step of correcting the gradation level of the current image signal in accordance with a difference of the gradation level of the previous image signal and that of the current image signal after the previous image signal and the current image signal being input thereto, wherein the correction processing part corrects the gradation level of the current image signal using a correction data table having two different pieces of correction data stored therein and switches the correction data table for a first half sub-frame and a second half sub-frame.

According to another embodiment of the present invention, there is provided a computer program for causing a computer to perform processing of an image being input to a display device including a frame doubling processing step of generating a doubled image signal by dividing one frame period of an input image signal that has been input into two sub-frames and repeating the input image signal twice; a false impulse drive processing step of dividing the doubled image signal into two sub-frames of different gradation levels whose time integral of luminance realizes luminance in one frame period of the input image signal; a current image signal storage step of outputting a previous image signal delayed by one sub-frame after storing a current image signal output by the false impulse drive processing part; a correction processing step of correcting the gradation level of the current image signal in accordance with a difference of the gradation level of the previous image signal and that of the current image signal after the previous image signal and the current image signal being input thereto; a delayed doubled image signal output step of outputting a delayed doubled image signal delayed by one sub-frame after storing the doubled image signal; and a movement detection step of outputting a movement detection signal by determining whether a still image or a dynamic image is concerned in accordance with a difference of the gradation level of the delayed doubled image signal and that of the doubled image signal after the delayed doubled image signal and the doubled image signal being input thereto, wherein the correction processing step corrects the gradation level of the current image signal when the movement detection signal is a signal indicating a dynamic image, and does not correct the gradation level of the current image signal when the movement detection signal is a signal indicating a still image.

According to another embodiment of the present invention, there is provided a computer program for causing a computer to perform processing of an image being input to a display device including a frame doubling processing step of generating a doubled image signal by dividing one frame period of an input image signal that has been input into two sub-frames and repeating the input image signal twice; a false impulse drive processing step of dividing the doubled image signal into two sub-frames of different gradation levels whose time integral of luminance realizes luminance in one frame period of the input image signal; a delayed doubled image signal of outputting a delayed doubled image signal delayed by one sub-frame after storing the doubled image signal; a reversed false impulse drive processing step of outputting the delayed doubled image signal as a previous image signal after dividing the delayed doubled image signal into two sub-frames of different gradation levels whose time integral of luminance realizes luminance in one frame period of the input image signal and interchanging a first half sub-frame and a second half sub-frame; a movement detection step of outputting a movement detection signal by determining whether a still image or a dynamic image is concerned in accordance with a difference of the gradation level of the delayed doubled image signal and that of the doubled image signal after the delayed doubled image signal and the doubled image signal being input thereto; and a correction processing step of correcting the gradation level of the current image signal in accordance with a difference of the gradation level of the previous image signal and that of the current image signal after the previous image signal and the current image signal being input thereto, wherein the correction processing step corrects the gradation level of the current image signal when the movement detection signal is a signal indicating a dynamic image, and does not correct the gradation level of the current image signal when the movement detection signal is a signal indicating a still image.

According to another embodiment of the present invention, there is provided a computer program for causing a computer to perform processing of an image being input to a display device including a frame doubling processing step of generating a doubled image signal by dividing one frame period of an input image signal that has been input into two sub-frames and repeating the input image signal twice; a false impulse drive processing step of outputting a signal obtained by dividing the doubled image signal into two sub-frames of different gradation levels whose time integral of luminance realizes luminance in one frame period of the input image signal as a current image signal; a previous image signal output step of outputting a previous image signal delayed by two sub-frames after storing a current image signal output by the false impulse drive processing part; and a correction processing step of correcting the gradation level of the current image signal in accordance with a difference of the gradation level of the previous image signal and that of the current image signal after the previous image signal and the current image signal being input thereto, wherein the correction processing part corrects the gradation level of the current image signal using a correction data table having two different pieces of correction data stored therein and switches the correction data table for a first half sub-frame and a second half sub-frame.

According to the embodiments of the present invention described above, when a still image is displayed, a new and improved image processing apparatus, image processing method, and computer program capable of improving both dynamic image blurring caused by the hold effect and that caused by slowness of the response speed of liquid crystal can be provided without causing deterioration of linearity of the gradation.

BRIEF DESCRIPTION OF THE DRAWINGS

FIG. 8 is an explanatory view exemplifying liquid crystal response correction data stored in a liquid crystal response correction table 14.

DETAILED DESCRIPTION OF THE PREFERRED EMBODIMENTS

Figure 1:
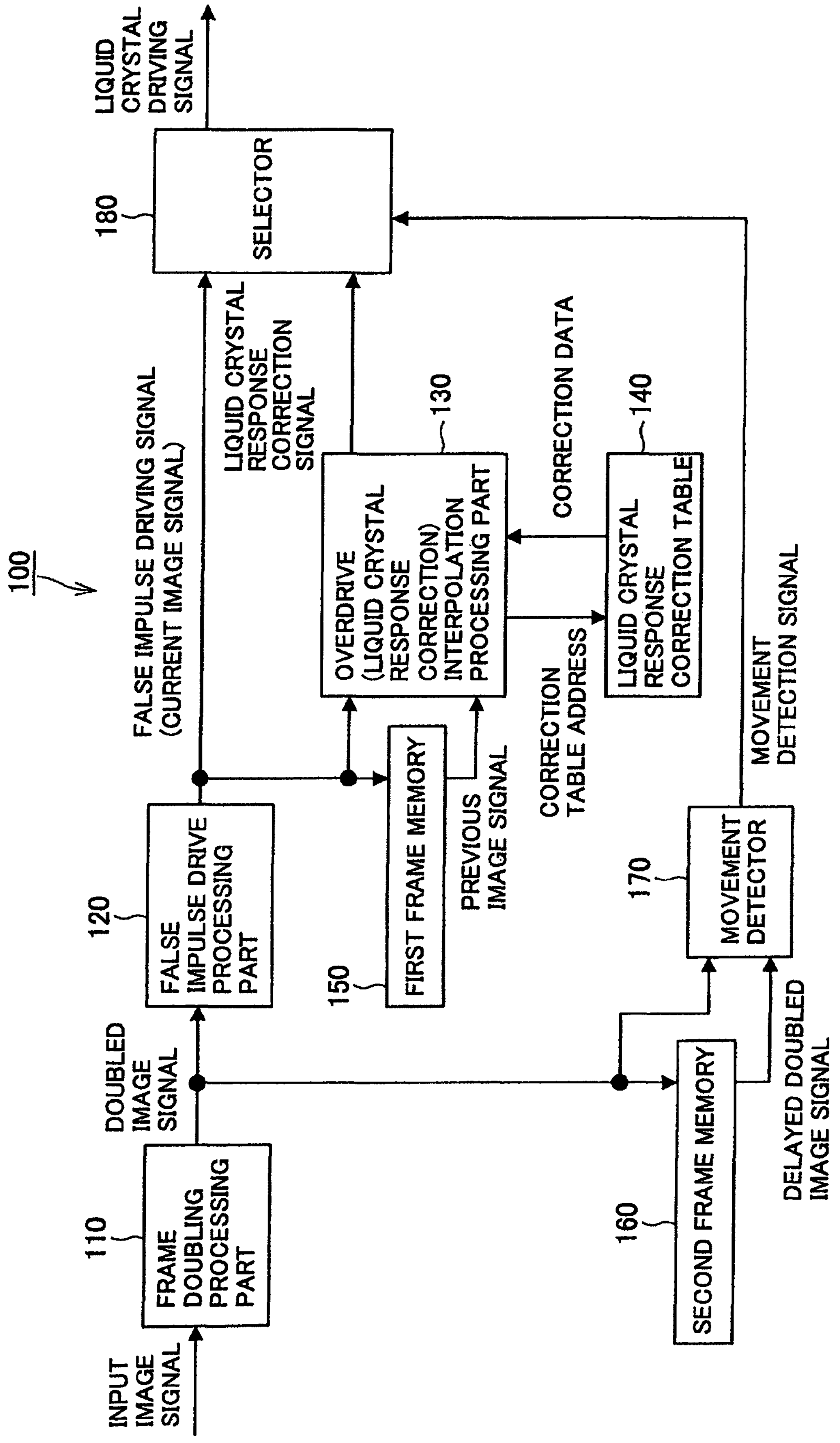
FIG. 1 is an explanatory view illustrating an image processing apparatus 100 according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, an image processing apparatus that prevents dynamic image blurring by combining time division driving as false impulse driving and an overdrive in the past will be described below.

Figure 6:
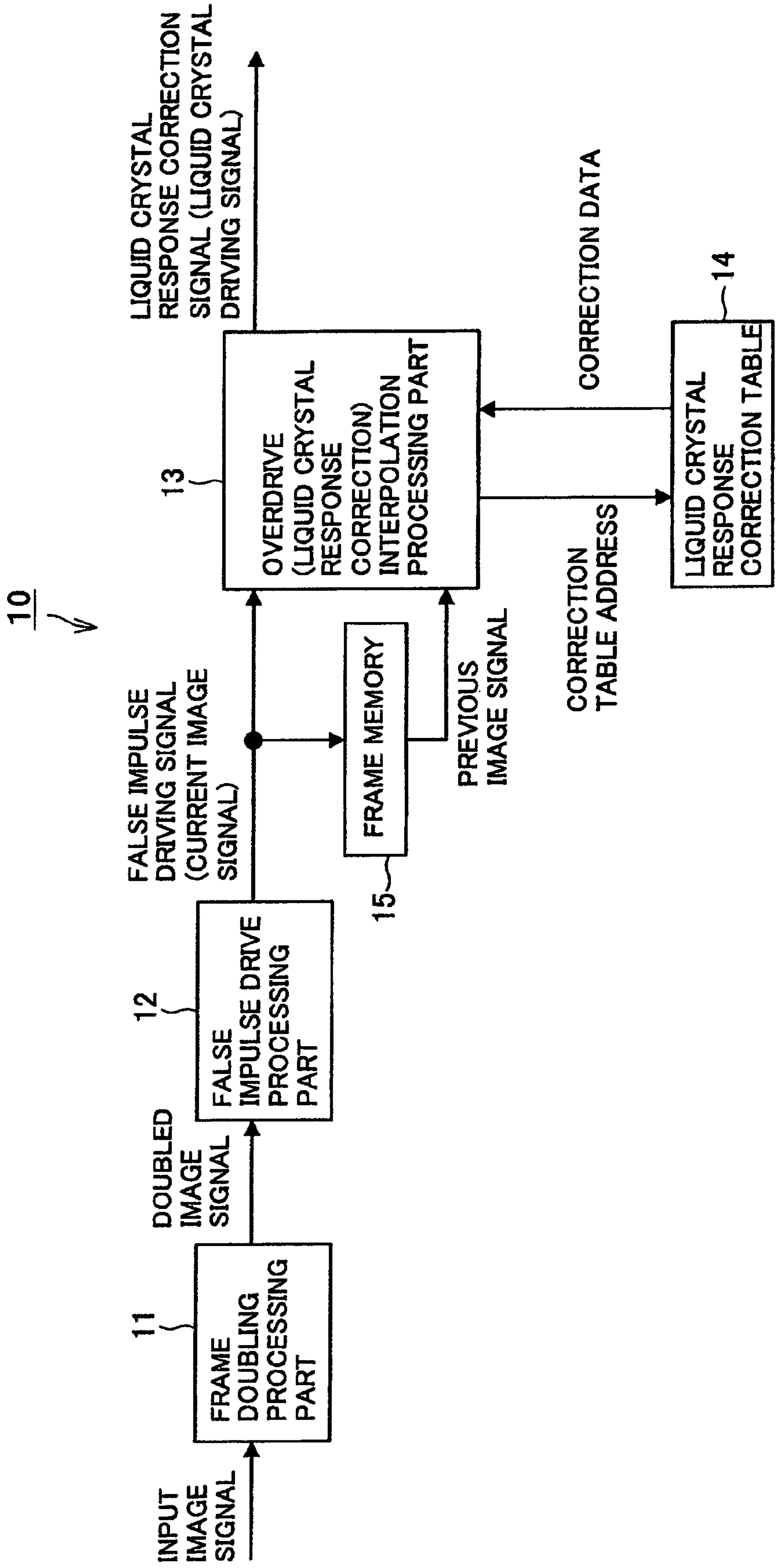
FIG. 6 is an explanatory view illustrating an image processing apparatus 10 in the past.

FIG. 6 is an explanatory view illustrating the image processing apparatus 10 in the past. The image processing apparatus 10 is used to prevent dynamic image blurring by combining time division driving as false impulse driving and an overdrive. As shown in FIG. 6, the image processing apparatus 10 in the past has a frame doubling processing part 11, the false impulse drive processing part 12, an overdrive interpolation processing part 13, the liquid crystal response correction table 14, and a frame memory 15.

The frame doubling processing part 11 outputs a doubled image signal by dividing one frame period of an image signal being input (input image signal) into two sub-frames and repeating the input image signal twice.

The false impulse drive processing part 12 divides one frame into two sub-frames of different gradation levels whose time integral of luminance realizes luminance in one frame period of an input image signal. The false impulse drive processing part 12 has a doubled image signal output from the frame doubling processing part 11 being input thereto and displays a first half sub-frame as a bright image and a second half sub-frame as a dark image. Thus, the false impulse drive processing part 12 converts each sub-frame into different display luminance in this manner to output as a false impulse driving signal. A false impulse signal output by the false impulse drive processing part 12 is also called a current image signal.

Figure 2:
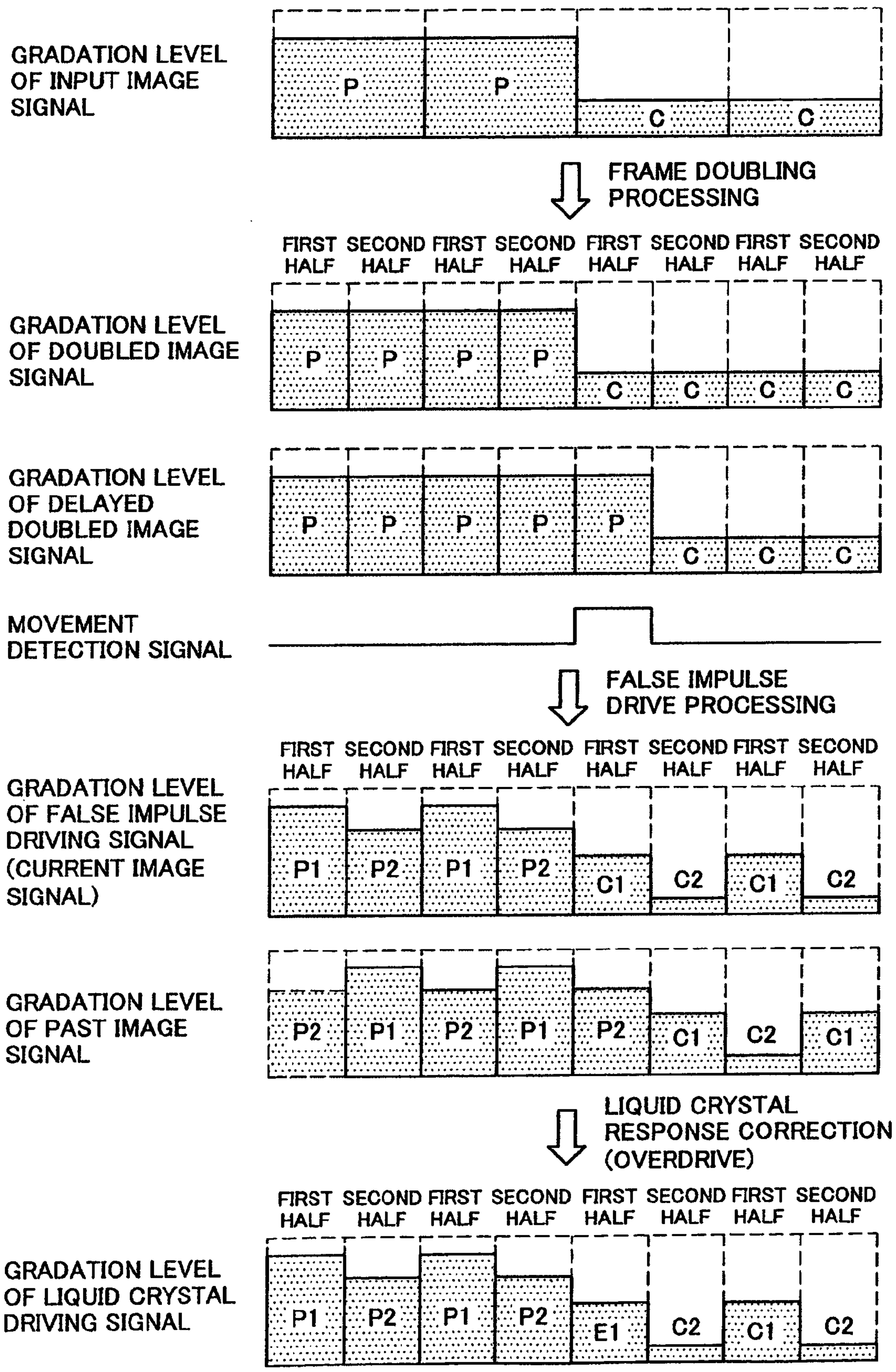
FIG. 2 is an explanatory view illustrating a gradation level of each signal, liquid crystal luminance, and perceived brightness when the gradation level of an input image signal is changed in the first embodiment of the present invention.
Figure 7:
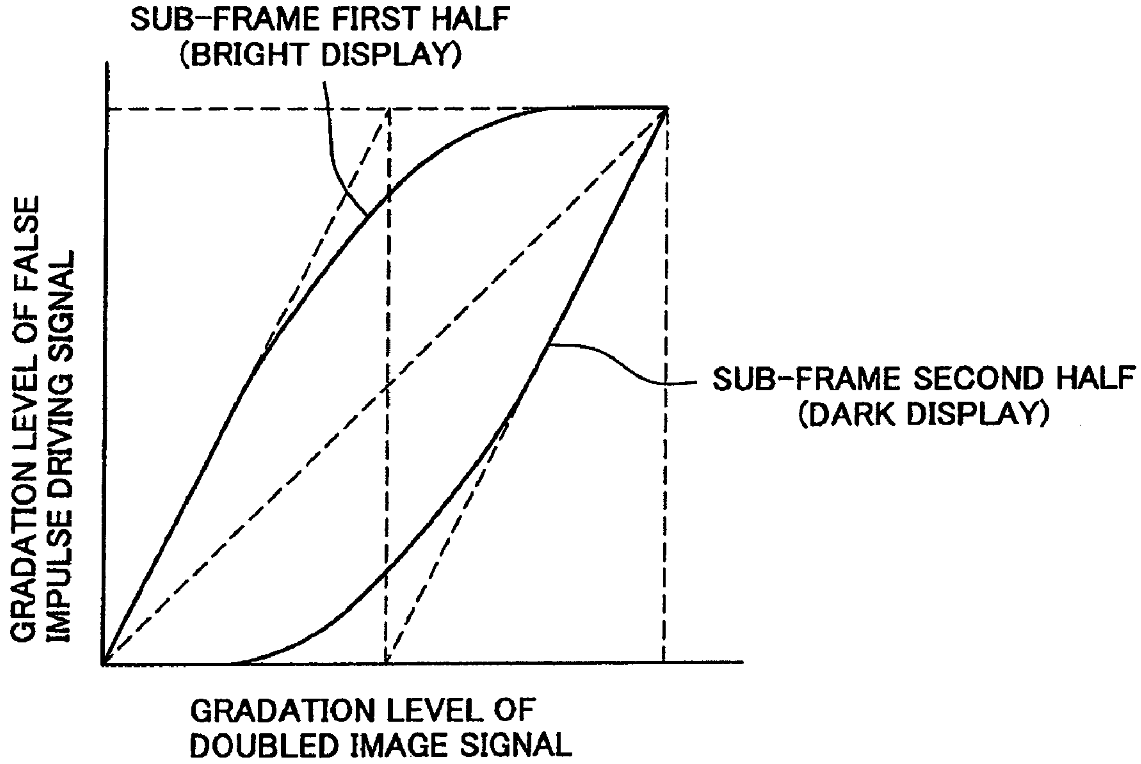
FIG. 7 is an explanatory view illustrating a false impulse driving signal generated by a false impulse drive processing part 12.

FIG. 7 is an explanatory view illustrating a false impulse driving signal generated by the false impulse drive processing part 12. As shown in FIG. 2, the false impulse drive processing part 12 generates a false impulse driving signal in such a way that the first half sub-frame is displayed as a bright image (clear display) and the second half sub-frame as a dark image (dark display).

The frame memory 15 has a false impulse signal (current image signal) output from the false impulse drive processing part 12 being input thereto before being output after delaying one sub-frame from the false impulse signal. A signal output by the frame memory 15 and delayed by one frame from the false impulse signal is also called a previous image signal.

The overdrive interpolation processing part 13 has a previous image signal output by the frame memory 15 and a current image signal output by the false impulse drive processing part 12 being input thereto to generate and output a liquid crystal response correction signal (liquid crystal driving signal).

The liquid crystal response correction table 14 is constituted by a memory such as a ROM (Read Only Memory) or RAM (Random Access Memory). Liquid crystal response correction data for generating a liquid crystal response correction signal by the overdrive interpolation processing part 13 is stored in the liquid crystal response correction table 14.

The liquid crystal response correction data is data to correct a liquid crystal driving signal so that, when changing from the gradation level of a previous image signal to that of a current image signal, luminance in accordance with the gradation level of the current image signal can be obtained. The liquid crystal response correction data is the gradation level itself of a liquid crystal response correction signal (liquid crystal driving signal) or a difference between the gradation level of the liquid crystal driving signal and that of the current image signal.

The size of the liquid crystal response correction table 14 can be made smaller by storing only liquid crystal response correction data corresponding to effective values selected as several higher-order bits of the gradation level of a previous image signal and several higher-order bits of the gradation level of a current image signal.

The overdrive interpolation processing part 13 generates a liquid crystal response correction table address from an input previous image signal and current image signal. Then, the overdrive interpolation processing part 13 reads liquid crystal response correction data from the liquid crystal response correction table 14 according to the generated liquid crystal response correction table address. When liquid crystal response correction data is read from the liquid crystal response correction table 14, the overdrive interpolation processing part 13 linearly interpolates the liquid crystal response correction data in accordance with the gradation level of the previous image signal and that of the current image signal and outputs the liquid crystal response correction signal.

FIG. 8 is an explanatory view exemplifying liquid crystal response correction data stored in the liquid crystal response correction table 14 in the image processing apparatus 10 in the past. The liquid crystal response correction data represents the gradation level itself of a liquid crystal driving signal. FIG. 8 shows determining the value of liquid crystal response correction data from the gradation level of a previous image signal and that of a current image signal.

Then, if the gradation level of a previous image signal and that of a current image signal are equal, as shown in FIG. 8, liquid crystal response correction data will also be a value equal to these. Therefore, in this case, an operation error of the overdrive interpolation processing part 13 will be 0.

Figure 9:
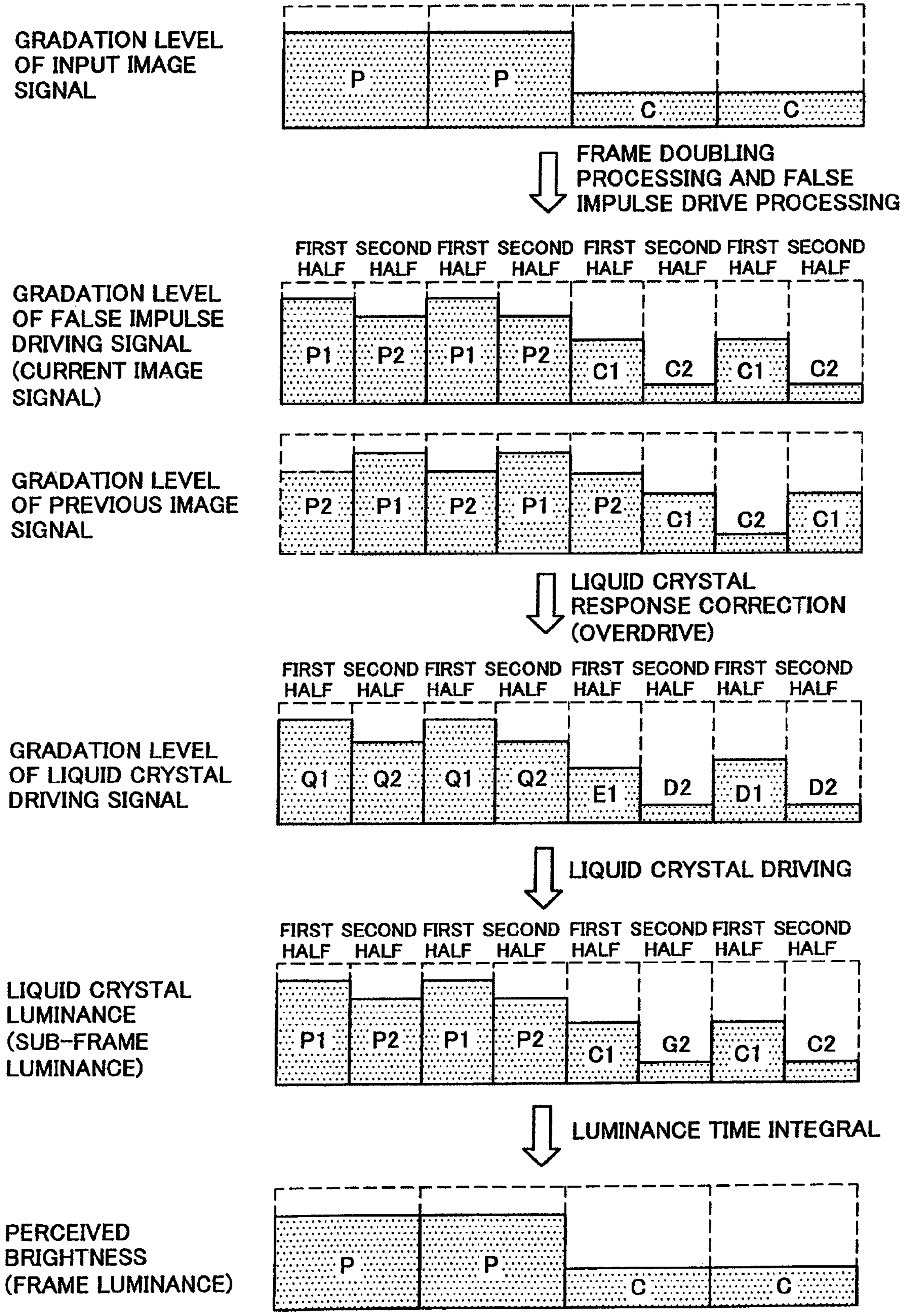
FIG. 9 is an explanatory view illustrating the gradation level of each signal, liquid crystal luminance, and perceived brightness when the gradation level of an input image signal is changed in the past.

FIG. 9 is an explanatory view illustrating the gradation level of each signal, liquid crystal luminance, and perceived brightness when the gradation level of an input image signal is changed for each frame like P→P→C→C in the image processing apparatus 10 in the past. Here, the size of the gradation levels is assumed to be P>C.

First, if the gradation levels of an input image signal being input are P and C, a doubled image signal is generated by the frame doubling processing part 11 and then a false impulse driving signal is generated by the false impulse drive processing part 12 from the generated doubled image signal. The gradation levels of the false impulse driving signal at this point are assumed to be P1 and C1 in the first half sub-frame and P2 and C2 in the second half sub-frame.

If there is no change in gradation level of an input image signal between frames like P→P or C<C, as shown in FIG. 9, that is, the image is a still image, the gradation level of a false impulse driving signal is different between the first half sub-frame and second half sub-frame. Therefore, the gradation level of the liquid crystal driving signal is corrected to Q1, Q2 or D1, D2 by the overdrive interpolation processing part 13. As a result, corrections are also made to a current image signal for an image whose gradation level does not change, that is, when a still image is input and an operation error of linear interpolation by the overdrive interpolation processing part 13 affects the liquid crystal driving signal. As a result, there is an issue of deterioration of linearity of the still image gradation in the image processing apparatus 10 in the past.

Thus, the present invention is designed to improve both dynamic image blurring caused by the hold effect and that caused by slowness of the response speed of liquid crystal without causing deterioration of linearity of the gradation when a still image is displayed.

FIRST EMBODIMENT

First, an image processing apparatus according to the first embodiment of the present invention will be described. FIG. 1 is an explanatory view illustrating the image processing apparatus 100 according to the first embodiment of the present invention. The image processing apparatus 100 according to the first embodiment of the present invention will be described below using FIG. 1.

The image processing apparatus 100 shown in FIG. 1 performs processing of images being input to a display device in a hold-type display device such as a liquid crystal display device. As shown in FIG. 1, the image processing apparatus 100 according to the first embodiment of the present invention has a frame doubling processing part 110, a false impulse drive processing part 120, an overdrive interpolation processing part 130, a liquid crystal response correction table 140, a first frame memory 150, a second frame memory 160, a movement detector 170, and a selector 180.

Like the above frame doubling processing part 11, the frame doubling processing part 110 outputs a doubled image signal by dividing one frame period of an image signal being input (input image signal) into two sub-frames and repeating the input image signal twice. The doubled image signal is output to the false impulse drive processing part 120, the second frame memory 160, and the movement detector 170.

Like the above false impulse drive processing part 12, the false impulse drive processing part 120 divides one frame into two sub-frames of different gradation levels whose time integral of luminance realizes luminance in one frame period of an input image signal. The false impulse drive processing part 120 has a doubled image signal output from the frame doubling processing part 110 being input thereto and displays a first half sub-frame as a bright image and a second half sub-frame as a dark image. Then, the false impulse drive processing part 120 converts each sub-frame into different display luminance in this manner to output as a false impulse driving signal (current image signal).

Though the false impulse drive processing part 120 displays the first half sub-frame as a bright image and the second half sub-frame as a dark image in the present embodiment, the first half sub-frame may be displayed as a dark image and the second half sub-frame as a bright image.

Like the above frame memory 15, the first frame memory 150 has a false impulse signal (current image signal) output from the false impulse drive processing part 120 being input thereto and output a delayed signal after delaying the doubled image signal by one sub-frame.

The overdrive interpolation processing part 130 has a previous image signal output by the first frame memory 150 and a current image signal output by the false impulse drive processing part 120 being input thereto to generate and output a liquid crystal response correction signal (liquid crystal driving signal).

Like the above liquid crystal response correction table 14, the liquid crystal response correction table 140 is constituted by a memory such as a ROM (Read Only Memory) or RAM (Random Access Memory). Liquid crystal response correction data for generating a liquid crystal response correction signal by the overdrive interpolation processing part 130 is stored in the liquid crystal response correction table 140. The liquid crystal response correction data stored in the liquid crystal response correction table 140 is similar to one described above and thus, detailed explanation thereof is omitted.

The second frame memory 160 has a doubled image signal output by the frame doubling processing part 110 being input thereto to output a delayed signal after delaying the doubled image signal by one sub-frame. A delayed signal output by the second frame memory 160 is called a delayed doubled image signal. The delayed doubled image signal output by the second frame memory 160 is input to the movement detector 170.

The movement detector 170 has a doubled image signal output by the frame doubling processing part 110 and a delayed doubled image signal output by the second frame memory 160 being input thereto to compare gradation levels of the two signals pixel by pixel. If, as a result of comparison, a difference between the gradation levels of the two signals is larger than a preset value, the movement detector 170 outputs a movement detection signal indicating change of the image. The movement detection signal output by the movement detector 170 is input to the selector 180. In the present embodiment, a high-level movement detection signal is output when any image change is detected and a low-level movement detection signal when no image change is detected. However, in the present invention, conversely, a low-level movement detection signal may be output when any image change is detected and a high-level movement detection signal when no image change is detected.

The selector 180 has a current image signal output by the false impulse drive processing part 120, a liquid crystal response correction signal output by the overdrive interpolation processing part 130, and a movement detection signal output by the movement detector 170 being input thereto. Then, the selector 180 outputs one of the current image signal and liquid crystal response correction signal in accordance with the value of the movement detection signal.

The image processing apparatus 100 according to the first embodiment of the present invention has been described above using FIG. 1. Then, an image processing method using the image processing apparatus 100 according to the first embodiment of the present invention will be described.

FIG. 2 is an explanatory view illustrating the gradation level of each signal, liquid crystal luminance, and perceived brightness when the gradation level of an input image signal is changed for each frame like P→P→C→C in the image processing apparatus 100 according to the first embodiment of the present invention.

When an input image signal whose gradation level is P and that whose gradation level is C are sequentially input to the frame doubling processing part 110, the frame doubling processing part 110 generates and outputs a doubled image signal for each input image signal.

A doubled image signal generated by the frame doubling processing part 110 becomes a delayed doubled image signal delayed by one sub-frame by being input to the second frame memory 160. When the delayed doubled image signal and doubled image signal are input to the movement detector 170, the movement detector 170 generates movement detection signal for one sub-frame period.

A doubled image signal generated by the frame doubling processing part 110 is input, on the other hand, to the false impulse drive processing part 120. The false impulse drive processing part 120 divides one frame into two sub-frames having different gradation levels P1, P2 and C1, C2 whose time integral of luminance realizes luminance in one frame period of an input image signal to generate a false impulse driving signal.

A false impulse driving signal (current image signal) generated by the false impulse drive processing part 120 is input to the first frame memory 150. The first frame memory 150 outputs the false impulse driving signal being input as a previous image signal after delaying one sub-frame.

A false impulse driving signal (current image signal) generated by the false impulse drive processing part 120 is also input to the overdrive interpolation processing part 130. In addition, a previous image signal output from the first frame memory 150 is also input to the overdrive interpolation processing part 130.

If there is any change between the gradation level of a delayed doubled image signal and that of a doubled image signal, the overdrive interpolation processing part 130 corrects a liquid crystal response. Here, the overdrive interpolation processing part 130 makes a correction of a liquid crystal response when the gradation level of the doubled image signal is C and that of the delayed doubled image signal is P. As a result of a correction being made by the overdrive interpolation processing part 130, the gradation level of a liquid crystal driving signal will be E1.

If, on the other hand, there is no change between the gradation level of a delayed doubled image signal and that of a doubled image signal, the overdrive interpolation processing part 130 makes no correction of a liquid crystal response and uses a false impulse driving signal (current image signal) generated by the false impulse drive processing part 120 unchanged as the gradation level of a liquid crystal driving signal.

Whether to use a signal corrected by the overdrive interpolation processing part 130 or a false impulse driving signal (current image signal) generated by the false impulse drive processing part 120 unchanged as a liquid crystal driving signal is determined based on a movement detection signal input to the selector 180. In the present embodiment, a signal corrected by the overdrive interpolation processing part 130 is used as a liquid crystal driving signal when a high-level movement detection signal is input to the selector 180, and a false impulse driving signal (current image signal) generated by the false impulse drive processing part 120 is used unchanged as a liquid crystal driving signal when a low-level movement detection signal is input to the selector 180.

The image processing method using the image processing apparatus 100 according to the first embodiment of the present invention has been described above.

Since an operation difference of the overdrive interpolation processing part 130 has no influence when there is no change in an image, that is, the image is a still image, as described above, linearity of the gradation of the still image will not deteriorate. Therefore, according to the first embodiment of the present invention, dynamic image blurring caused by the hold effect and that caused by slowness of the response speed can be simultaneously improved without causing deterioration of linearity of the gradation of a still image.

SECOND EMBODIMENT

In the first embodiment of the present invention, two frame memories are used to delay a signal for execution of movement detection and gradation level corrections. In the second embodiment of the present invention, an image processing apparatus and an image processing method that use only one frame memory for execution of movement detection and gradation level corrections will be described.

Figure 3:
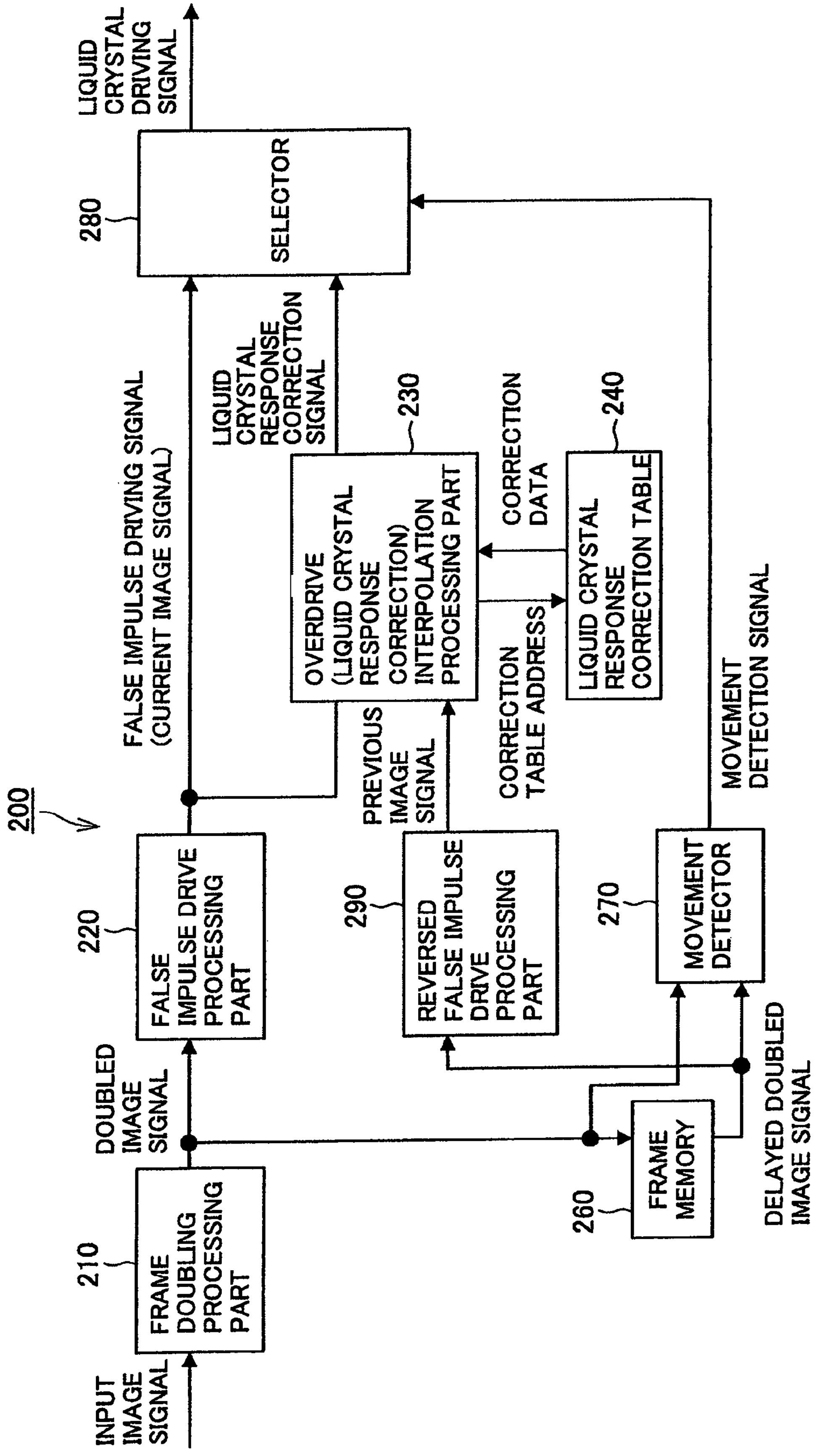
FIG. 3 is an explanatory view illustrating an image processing apparatus 200 according to a second embodiment of the present invention.

FIG. 3 is an explanatory view illustrating the image processing apparatus 200 according to the second embodiment of the present invention. The image processing apparatus 200 according to the second embodiment of the present invention will be described below using FIG. 3.

The image processing apparatus 200 shown in FIG. 3 performs processing of images being input to a display device in a hold-type display device such as a liquid crystal display device. As shown in FIG. 3, the image processing apparatus 200 according to the second embodiment of the present invention has a frame doubling processing part 210, a false impulse drive processing part 220, an overdrive interpolation processing part 230, a liquid crystal response correction table 240, a frame memory 260, a movement detector 270, a selector 280, and a reversed false impulse drive processing part 290.

Like the frame doubling processing part 110 in the first embodiment, the frame doubling processing part 210 outputs a doubled image signal by dividing one frame period of an input image signal into two sub-frames and repeating the input image signal twice. The doubled image signal is output to the false impulse drive processing part 220, the frame memory 260, and the movement detector 270.

Like the false impulse drive processing part 120 in the first embodiment, the false impulse drive processing part 220 divides one frame into two sub-frames of different gradation levels whose time integral of luminance realizes luminance in one frame period of an input image signal. The false impulse drive processing part 220 has a doubled image signal output from the frame doubling processing part 210 being input thereto and displays a first half sub-frame as a bright image and a second half sub-frame as a dark image. Then, the false impulse drive processing part 220 converts each sub-frame into different display luminance in this manner to output as a false impulse driving signal (current image signal).

Though the false impulse drive processing part 220 displays the first half sub-frame as a bright image and the second half sub-frame as a dark image in the present embodiment, the first half sub-frame may be displayed as a dark image and the second half sub-frame as a bright image.

Like the second memory 160 in the first embodiment, the frame memory 260 has a doubled image signal output by the frame doubling processing part 210 being input thereto to output a delayed signal after delaying the doubled image signal by one sub-frame. A delayed signal output by the frame memory 260 is called a delayed doubled image signal. The delayed doubled image signal output by the frame memory 260 is each input to the movement detector 270 and the reversed false impulse drive processing part 290.

Like the movement detector 170 in the first embodiment, the movement detector 270 has a doubled image signal output by the frame doubling processing part 210 and a delayed doubled image signal output by the frame memory 260 being input thereto to compare gradation levels of the two signals pixel by pixel. If, as a result of comparison, a difference between the gradation levels of the two signals is larger than a preset value, the movement detector 270 outputs a movement detection signal indicating change of the image. The movement detection signal output by the movement detector 270 is input to the selector 280. In the present embodiment, a high-level movement detection signal is output when any image change is detected and a low-level movement detection signal when no image change is detected. However, in the present invention, conversely, a low-level movement detection signal may be output when any image change is detected and a high-level movement detection signal when no image change is detected.

Like the selector 180 in the first embodiment, the selector 280 has a current image signal output by the false impulse drive processing part 220, a liquid crystal response correction signal output by the overdrive interpolation processing part 230, and a movement detection signal output by the movement detector 270 being input thereto. Then, the selector 280 outputs one of the current image signal and liquid crystal response correction signal in accordance with the value of the movement detection signal.

The reversed false impulse drive processing part 290 is obtained by interchanging processing of the first half sub-frame and second half sub-frame of the false impulse drive processing part 220. That is, if the false impulse drive processing part 220 displays the first half sub-frame as a bright image and the second half sub-frame as a dark image, the reversed false impulse drive processing part 290 displays the first half sub-frame as a dark image and the second half sub-frame as a bright image. By interchanging the first half and second half sub-frames in this manner, a signal equivalent to that one sub-frame delayed can be generated. A signal generated by the reversed false impulse drive processing part 290 is input to the overdrive interpolation processing part 230 as a previous image signal.

The overdrive interpolation processing part 230 has a previous image signal output by the reversed false impulse drive processing part 290 and a current image signal output by the false impulse drive processing part 220 being input thereto to generate and output a liquid crystal response correction signal (liquid crystal driving signal).

Like the liquid crystal response correction table 140 in the first embodiment, the liquid crystal response correction table 240 is constituted by a memory such as a ROM (Read Only Memory) or RAM (Random Access Memory). Liquid crystal response correction data for generating a liquid crystal response correction signal by the overdrive interpolation processing part 230 is stored in the liquid crystal response correction table 240.

The image processing apparatus 200 according to the second embodiment of the present invention has been described above. By configuring the image processing apparatus as described above, like one in the first embodiment of the present invention, an operation difference of the overdrive interpolation processing part 230 has no influence when there is no change in an image, that is, the image is a still image and therefore, linearity of the gradation of the still image will not deteriorate. Therefore, according to the second embodiment of the present invention, dynamic image blurring caused by the hold effect and that caused by slowness of the response speed can be simultaneously improved without causing deterioration of linearity of the gradation of a still image.

THIRD EMBODIMENT

In the first and second embodiments of the present invention, image processing apparatuses and image processing methods capable of simultaneously improving dynamic image blurring caused by the hold effect and that caused by slowness of the response speed without causing deterioration of linearity of the gradation of a still image by inputting a movement detection signal based on a comparison result of a previous image signal and a current image signal to a selector to use one of a signal corrected by an overdrive interpolation processing part and a false impulse driving signal (current image signal) generated by a false impulse drive processing part as a liquid crystal driving signal have been described.

In the third embodiment of the present invention, an image processing apparatus and an image processing method capable of simultaneously improving dynamic image blurring caused by the hold effect and that caused by slowness of the response speed without causing deterioration of linearity of the gradation of a still image with a configuration different from that of the first and second embodiment will be described.

Figure 4:
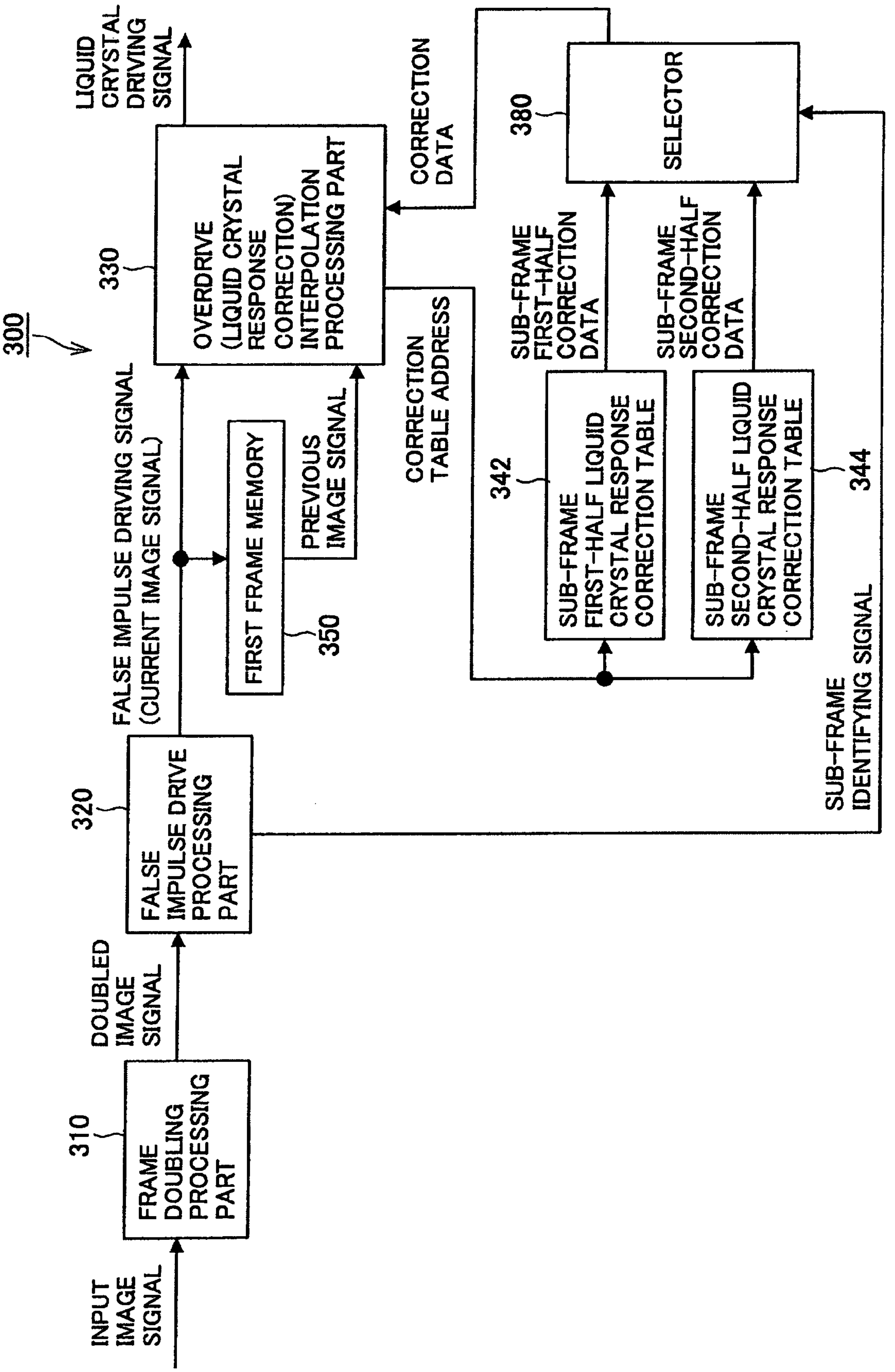
FIG. 4 is an explanatory view illustrating an image processing apparatus 300 according to a third embodiment of the present invention.

FIG. 4 is an explanatory view illustrating the image processing apparatus 300 according to the third embodiment of the present invention. The image processing apparatus 300 according to the third embodiment of the present invention will be described below using FIG. 4.

The image processing apparatus 300 shown in FIG. 4 performs processing of images being input to a display device in a hold-type display device such as a liquid crystal display device. As shown in FIG. 4, the image processing apparatus 300 according to the third embodiment of the present invention has a frame doubling processing part 310, a false impulse drive processing part 320, an overdrive interpolation processing part 330, a sub-frame first-half liquid crystal response correction table 342, a sub-frame second-half liquid crystal response correction table 344, a frame memory 350, and a selector 380.

Like the above frame doubling processing parts 110, 210, the frame doubling processing part 310 outputs a doubled image signal by dividing one frame period of an input image signal into two sub-frames and repeating the input image signal twice. The doubled image signal is output to the false impulse drive processing part 320.

Like the above false impulse drive processing parts 120, 220, the false impulse drive processing part 320 divides one frame into two sub-frames of different gradation levels whose time integral of luminance realizes luminance in one frame period of an input image signal. The false impulse drive processing part 320 has a doubled image signal output from the frame doubling processing part 310 being input thereto and displays a first half sub-frame as a bright image and a second half sub-frame as a dark image. Then, the false impulse drive processing part 320 converts each sub-frame into different display luminance in this manner to output as a false impulse driving signal (current image signal).

Then, the false impulse drive processing part 320 according to the present embodiment outputs, in addition to the current image signal, a sub-frame identifying signal to the selector 380. The sub-frame identifying signal is a signal for identifying whether the sub-frame is a first half sub-frame or a second half sub-frame. For example, a signal that outputs a high level during the first-half sub-frame period and a low level during the second-half sub-frame period may be output as a sub-frame identifying signal. Or conversely, a signal that outputs a low level during the first-half sub-frame period and a high level during the second-half sub-frame period may be output.

Also in the present embodiment, though the false impulse drive processing part 320 displays the first half sub-frame as a bright image and the second half sub-frame as a dark image, the first half sub-frame may be displayed as a dark image and the second half sub-frame as a bright image.

The frame memory 350 has a false impulse signal (current image signal) output by the false impulse drive processing part 320 being input thereto to output a previous image signal after delaying two sub-frames. With the signal output by being delayed by two sub-frames, when the current image signal is a signal resulting from processing of a first half sub-frame by the false impulse drive processing part 320, the previous image signal also resulting from processing of a first half sub-frame, and when the current image signal is a signal resulting from processing of a second half sub-frame by the false impulse drive processing part 320, the previous image signal also resulting from processing of a second half sub-frame. Therefore, when a still image is input, the previous image signal and current image signal will have the same gradation level.

The overdrive interpolation processing part 330 has a previous image signal output by the frame memory 350 and a current image signal output by the false impulse drive processing part 320 being input thereto to generate and output a liquid crystal response correction signal (liquid crystal driving signal).

The sub-frame first-half liquid crystal response correction table 342 and the sub-frame second-half liquid crystal response correction table 344 are each constituted by a memory such as a ROM (Read Only Memory) or RAM (Random Access Memory). Liquid crystal response correction data for generating a liquid crystal response correction signal for a first half sub-frame in the overdrive interpolation processing part 330 is stored in the sub-frame first-half liquid crystal response correction table 342. Similarly, liquid crystal response correction data for generating a liquid crystal response correction signal for a second half sub-frame in the overdrive interpolation processing part 330 is stored in the sub-frame second-half liquid crystal response correction table 344.

Liquid crystal response correction data stored in the sub-frame first-half liquid crystal response correction table 342 and the sub-frame second-half liquid crystal response correction table 344 is similar to that stored in the liquid crystal response correction table 140 and therefore, detailed explanation thereof is omitted.

The selector 380 has correction data input from the sub-frame first-half liquid crystal response correction table 342 and the sub-frame second-half liquid crystal response correction table 344 and outputs one of the two pieces of correction data to the overdrive interpolation processing part 330 in accordance with a sub-frame identifying signal output by the false impulse drive processing part 320.

The image processing apparatus 300 according to the third embodiment of the present invention has been described above using FIG. 4. Then, an image processing method using the image processing apparatus 300 according to the third embodiment of the present invention will be described.

Figure 5:
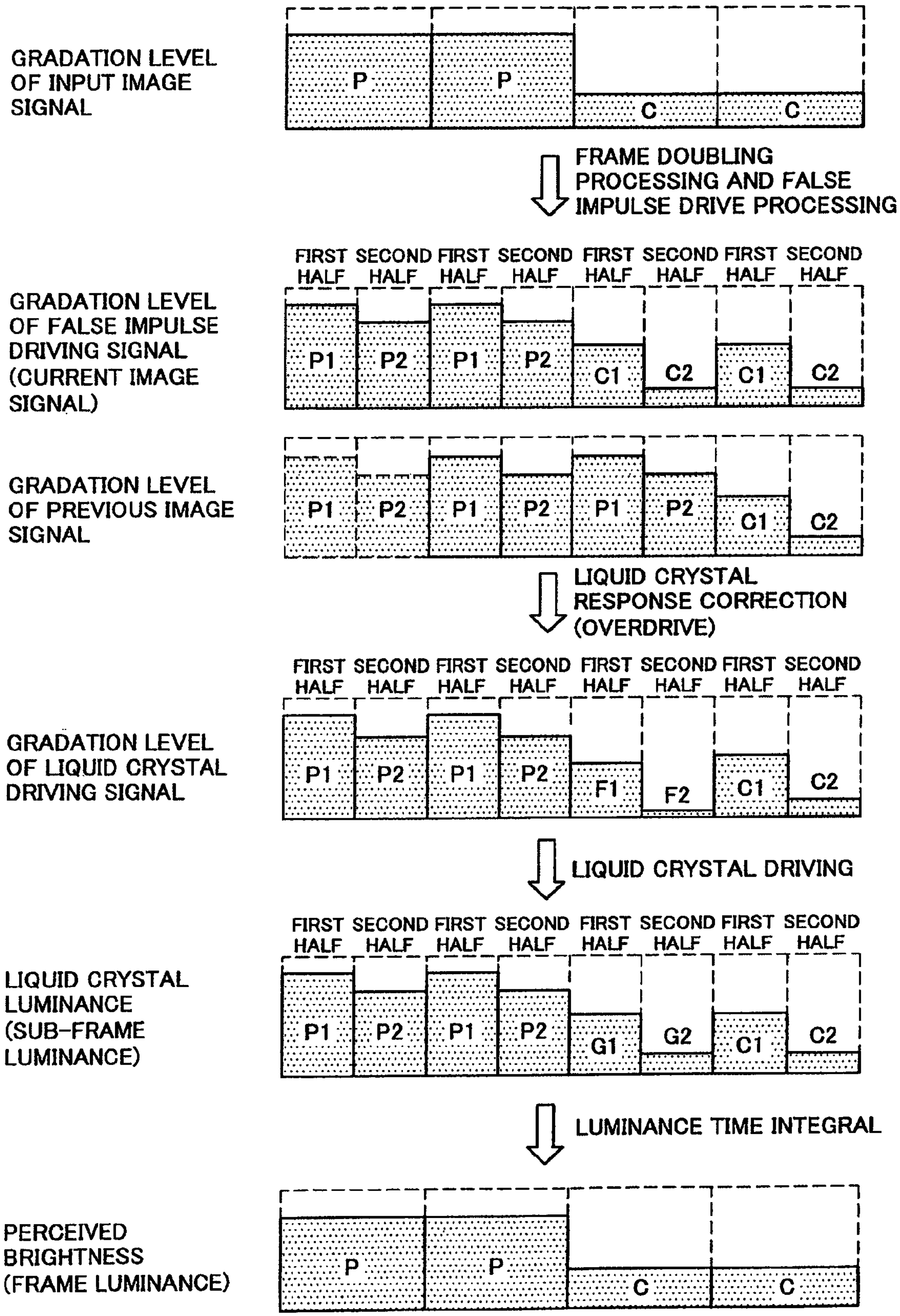
FIG. 5 is an explanatory view illustrating the gradation level of each signal, liquid crystal luminance, and perceived brightness when the gradation level of an input image signal is changed in the third embodiment of the present invention.

FIG. 5 is an explanatory view illustrating the gradation level of each signal, liquid crystal luminance, and perceived brightness when the gradation level of an input image signal is changed for each frame like P→P→C→C in the image processing apparatus 300 according to the third embodiment of the present invention. Here, the size of the gradation levels is assumed to be P>C.

When an input image signal whose gradation level is P and that whose gradation level is C are sequentially input to the frame doubling processing part 310, the frame doubling processing part 310 generates and outputs a doubled image signal for each input image signal.

A doubled image signal generated by the frame doubling processing part 310 is input to the false impulse drive processing part 320. The false impulse drive processing part 320 divides one frame into two sub-frames having different gradation levels P1, P2 and C1, C2 whose time integral of luminance realizes luminance in one frame period of an input image signal to generate a false impulse driving signal.

A false impulse driving signal (current image signal) generated by the false impulse drive processing part 320 is input to the frame memory 350. The frame memory 350 outputs the false impulse driving signal being input as a previous image signal after delaying two sub-frames.

A false impulse driving signal (current image signal) generated by the false impulse drive processing part 320 is also input to the overdrive interpolation processing part 330. In addition, a previous image signal output from the frame memory 350 is also input to the overdrive interpolation processing part 330.

If there is any change between the gradation level of a current image signal and that of a previous image signal, the overdrive interpolation processing part 330 corrects a liquid crystal response. Here, the overdrive interpolation processing part 330 makes a correction of a liquid crystal response when the gradation level of the current image signal is C1 and that of the previous image signal is P1 and when the gradation level of the current image signal is C2 and that of the previous image signal is P2. As a result of a correction being made by the overdrive interpolation processing part 330, the gradation level of a liquid crystal driving signal will be E1.

If, on the other hand, there is no change between the gradation level of a current image signal and that of a previous image signal, the overdrive interpolation processing part 330 makes no correction of a liquid crystal response and uses a false impulse driving signal (current image signal) generated by the false impulse drive processing part 320 unchanged as the gradation level of a liquid crystal driving signal.

The image processing method using the image processing apparatus 300 according to the third embodiment of the present invention has been described above.

Since an operation difference of the overdrive interpolation processing part 330 has no influence when there is no change in an image, that is, the image is a still image, as described above, linearity of the gradation of the still image will not deteriorate. Therefore, according to the third embodiment of the present invention, dynamic image blurring caused by the hold effect and that caused by slowness of the response speed can be simultaneously improved without causing deterioration of linearity of the gradation of a still image.

The above image processing methods may be performed by sequentially invoking computer programs stored a storage part provided in the image processing apparatus 100, 200, or 300 or in an image display device containing the image processing apparatus 100, 200, or 300. Various kinds of ROM may be used as a storage part.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for performing processing of an image being input to a display device, comprising:

a frame doubling processing part for generating a doubled image signal by dividing one frame period of an input image signal that has been input into two sub-frames and repeating the input image signal twice;

a false impulse drive processing part for outputting a signal obtained by dividing the doubled image signal into two sub-frames of different gradation levels whose time integral of luminance realizes luminance in one frame period of the input image signal as a current image signal;

a first frame memory for outputting a previous image signal delayed by one sub-frame after storing the current image signal output by the false impulse drive processing part;

a correction processing part for correcting the gradation level of the current image signal in accordance with a difference of the gradation level of the previous image signal and that of the current image signal after the previous image signal and the current image signal being input thereto so as to form a corrected signal;

a second frame memory for outputting a delayed doubled image signal delayed by one sub-frame after storing the doubled image signal;

a movement detector for outputting a movement detection signal by determining whether a still image or a dynamic image is concerned in accordance with a difference of the gradation level of the delayed doubled image signal and that of the doubled image signal after the delayed doubled image signal and the doubled image signal being input thereto; and a selector which selects and outputs the signal outputted from the false impulse drive processing part or the corrected signal from the correction processing part based on the movement detection signal, such that (i) the signal outputted from the false impulse drive processing part is selected and outputted when the movement detector determines that the still image is concerned and (ii) the corrected signal is selected and outputted when the movement detector determines that the dynamic image is concerned.

2. An image processing apparatus for performing processing of an image being input to a display device, comprising:

a frame doubling processing part for generating a doubled image signal by dividing one frame period of an input image signal that has been input into two sub-frames and repeating the input image signal twice;

a false impulse drive processing part for outputting a signal obtained by dividing the doubled image signal into two sub-frames of different gradation levels whose time integral of luminance realizes luminance in one frame period of the input image signal as a current image signal;

a frame memory for outputting a delayed doubled image signal delayed by one sub-frame after storing the doubled image signal;

a reversed false impulse drive processing part for outputting a signal obtained by dividing the delayed doubled image signal into two sub-frames of different gradation levels whose time integral of luminance realizes luminance in one frame period of the input image signal and interchanging a first half sub-frame and a second half sub-frame as a previous image signal;

a movement detector for outputting a movement detection signal by determining whether a still image or a dynamic image is concerned in accordance with a difference of the gradation level of the delayed doubled image signal and that of the doubled image signal after the delayed doubled image signal and the doubled image signal being input thereto; and a correction processing part for correcting the gradation level of the current image signal in accordance with a difference of the gradation level of the previous image signal and that of the current image signal after the previous image signal and the current image signal being input thereto, wherein the correction processing part corrects the gradation level of the current image signal when the movement detection signal is a signal indicating a dynamic image, and does not correct the gradation level of the current image signal when the movement detection signal is a signal indicating a still image.

3. An image processing method for performing processing of an image being input to a display device, comprising:

a frame doubling processing step of generating a doubled image signal by dividing one frame period of an input image signal that has been input into two sub-frames and repeating the input image signal twice;

a false impulse drive processing step of dividing the doubled image signal into two sub-frames of different gradation levels whose time integral of luminance realizes luminance in one frame period of the input image signal;

a current image signal storage step of outputting a previous image signal delayed by one sub-frame after storing a current image signal output by the false impulse drive processing part;

a correction processing step of correcting the gradation level of the current image signal in accordance with a difference of the gradation level of the previous image signal and that of the current image signal after the previous image signal and the current image signal being input thereto so as to form a corrected signal;

a delayed doubled image signal output step of outputting a delayed doubled image signal delayed by one sub-frame after storing the doubled image signal; and a movement detection step of outputting a movement detection signal by determining whether a still image or a dynamic image is concerned in accordance with a difference of the gradation level of the delayed doubled image signal and that of the doubled image signal after the delayed doubled image signal and the doubled image signal being input thereto; and a selector step of selecting and outputting the signal outputted from the false impulse drive processing step or the corrected signal based on the movement detection signal, such that (i) the signal outputted from the false impulse drive processing step is selected and outputted when the movement detection step determines that the still image is concerned and (ii) the corrected signal is selected and outputted when the movement detection step determines that the dynamic image is concerned.

4. An image processing method for performing processing of an image being input to a display device, comprising:

a frame doubling processing step of generating a doubled image signal by dividing one frame period of an input image signal that has been input into two sub-frames and repeating the input image signal twice;

a false impulse drive processing step of dividing the doubled image signal into two sub-frames of different gradation levels whose time integral of luminance realizes luminance in one frame period of the input image signal;

a delayed doubled image signal output step of outputting a delayed doubled image signal delayed by one sub-frame after storing the doubled image signal;

a reversed false impulse drive processing step of outputting the delayed doubled image signal as a previous image signal after dividing the delayed doubled image signal into two sub-frames of different gradation levels whose time integral of luminance realizes luminance in one frame period of the input image signal and interchanging a first half sub-frame and a second half sub-frame;

a movement detection step of outputting a movement detection signal by determining whether a still image or a dynamic image is concerned in accordance with a difference of the gradation level of the delayed doubled image signal and that of the doubled image signal after the delayed doubled image signal and the doubled image signal being input thereto; and a correction processing step of correcting the gradation level of the current image signal in accordance with a difference of the gradation level of the previous image signal and that of the current image signal after the previous image signal and the current image signal being input thereto, wherein the correction processing step corrects the gradation level of the current image signal when the movement detection signal is a signal indicating a dynamic image, and does not correct the gradation level of the current image signal when the movement detection signal is a signal indicating a still image.

5. A computer readable memory having stored thereon a computer program for causing a computer to perform processing of an image being input to a display device, comprising:

a frame doubling processing step of generating a doubled image signal by dividing one frame period of an input image signal that has been input into two sub-frames and repeating the input image signal twice;

a false impulse drive processing step of dividing the doubled image signal into two sub-frames of different gradation levels whose time integral of luminance realizes luminance in one frame period of the input image signal;

a current image signal storage step of outputting a previous image signal delayed by one sub-frame after storing a current image signal output by the false impulse drive processing step;

a correction processing step of correcting the gradation level of the current image signal in accordance with a difference of the gradation level of the previous image signal and that of the current image signal after the previous image signal and the current image signal being input thereto so as to form a corrected signal;

a delayed doubled image signal output step of outputting a delayed doubled image signal delayed by one sub-frame after storing the doubled image signal;

a movement detection step of outputting a movement detection signal by determining whether a still image or a dynamic image is concerned in accordance with a difference of the gradation level of the delayed doubled image signal and that of the doubled image signal after the delayed doubled image signal and the doubled image signal being input thereto; and a selector step of selecting and outputting the signal outputted from the false impulse drive processing step or the corrected signal based on the movement detection signal, such that (i) the signal outputted from the false impulse drive processing step is selected and outputted when the movement detection step determines that the still image is concerned and (ii) the corrected signal is selected and outputted when the movement detection step determines that the dynamic image is concerned.

6. A computer readable memory having stored thereon a computer program for causing a computer to perform processing of an image being input to a display device, comprising:

a frame doubling processing step of generating a doubled image signal by dividing one frame period of an input image signal that has been input into two sub-frames and repeating the input image signal twice;

a false impulse drive processing step of dividing the doubled image signal into two sub-frames of different gradation levels whose time integral of luminance realizes luminance in one frame period of the input image signal;

a delayed doubled image signal of outputting a delayed doubled image signal delayed by one sub-frame after storing the doubled image signal;

a reversed false impulse drive processing step of outputting the delayed doubled image signal as a previous image signal after dividing the delayed doubled image signal into two sub-frames of different gradation levels whose time integral of luminance realizes luminance in one frame period of the input image signal and interchanging a first half sub-frame and a second half sub-frame;

a movement detection step of outputting a movement detection signal by determining whether a still image or a dynamic image is concerned in accordance with a difference of the gradation level of the delayed doubled image signal and that of the doubled image signal after the delayed doubled image signal and the doubled image signal being input thereto; and a correction processing step of correcting the gradation level of the current image signal in accordance with a difference of the gradation level of the previous image signal and that of the current image signal after the previous image signal and the current image signal being input thereto, wherein the correction processing step corrects the gradation level of the current image signal when the movement detection signal is a signal indicating a dynamic image, and does not correct the gradation level of the current image signal when the movement detection signal is a signal indicating a still image.

* * * * *